United States Patent

Di Settembrini

[11] Patent Number: 5,509,796
[45] Date of Patent: Apr. 23, 1996

[54] MACHINE FOR MANUFACTURING HOLLOW BODIES BY BLOW MOLDING

[75] Inventor: Antoine Di Settembrini, Saint Ouen l'Aumone, France

[73] Assignee: ADS, Saint Ouen l'Aumone, France

[21] Appl. No.: 284,674

[22] PCT Filed: Jan. 7, 1994

[86] PCT No.: PCT/FR94/00020

§ 371 Date: Aug. 23, 1994

§ 102(e) Date: Aug. 23, 1994

[87] PCT Pub. No.: WO94/15770

PCT Pub. Date: Jul. 21, 1994

[30] Foreign Application Priority Data

Jan. 8, 1993 [FR] France ................... 93 00135

[51] Int. Cl.⁶ .................................... B29C 49/00
[52] U.S. Cl. ................. 425/526; 425/534; 425/537
[58] Field of Search .................. 425/534, 537, 425/526

[56] References Cited

U.S. PATENT DOCUMENTS

| | | |
|---|---|---|
| 2,792,593 | 5/1957 | Hardgrove . |
| 3,832,101 | 8/1974 | Rainville .................. 425/537 X |
| 3,850,566 | 11/1974 | Moore . |
| 4,214,860 | 7/1980 | Kleimenhagen et al. .......... 425/534 X |
| 4,233,010 | 11/1980 | Suzuki ................... 425/534 X |
| 4,479,772 | 10/1984 | Kleimenhagen . |
| 5,110,282 | 5/1992 | Voss ..................... 425/534 |

FOREIGN PATENT DOCUMENTS

| | | |
|---|---|---|
| 2510470 | 2/1983 | France . |
| 3247194 | 7/1983 | Germany . |

Primary Examiner—James C. Housel
Assistant Examiner—Krisanne M. Thornton
Attorney, Agent, or Firm—Greenblum & Bernstein

[57] ABSTRACT

A machine for manufacturing hollow bodies by blow molding thermoplastic preforms includes at least one preform heating apparatus and an assembly of molding stations fixedly arranged in an arc of a circle. The molding stations each further include a finished product ejector. A rotary transfer device is provided between the heating apparatus and the molding stations to transfer the heated preforms. The transfer device preferably has the shape of a wheel coaxial with an arc of a circle on which the molding stations are arranged. The wheel includes a carrier distributed uniformly along a circle to take heated preforms and deposit them into receptors on the molding stations.

21 Claims, 1 Drawing Sheet

MACHINE FOR MANUFACTURING HOLLOW BODIES BY BLOW MOLDING

The invention is related to a machine for manufacturing hollow bodies from thermoplastic preforms by blow molding. More specifically, the invention is intended for the production of biaxially-oriented thermoplastic receptacles, such as bottles or flasks.

It is known to manufacture biaxially-oriented thermoplastic bottles from preforms obtained, for example, by injection.

A preform is generally shaped like a tube closed at one end, whereas its other open end is provided with a ring, possibly equipped at its base with a counter-ring in the shape of a projecting flange. Apart from its ring and counter-ring, the preform must be subject to an expansion during a molding operation, known as stretch-blow molding.

For this, after manufacturing, the thermoplastic preforms must be subject to an appropriate thermal treatment, prior to the molding operation by stretch-blow molding in order to bring their material to a proper forming temperature and molecular orientation. Certain characteristics of the finished product, such as resistance, transparency, etc., especially depend upon this thermal treatment.

Bottles are generally molded by means of a mold which grips each preform, and a molding and stretching blow pipe which is introduced into the open portion of said preform to ensure the stretching and expansion thereof by blow molding under pressure.

The machines provided for this type of manufacturing are displayed, for example, in a straight line; this limits the number of molds, which the shot rates depend upon.

This is why we have contemplated rotating machines enabling better rates.

These known machines are generally composed of an apparatus for feeding and heating the preforms, and a wheel for blow molding. The heating apparatus is, for example, of the rotary unwinding type, and even more specifically, also in the shape of a wheel, such as for example, the molding machine described in FR-A-2 510 470.

In addition, this type of apparatus has transfer means, especially for transferring the preforms from the heating apparatus towards the molding wheel to evacuate the product after molding, or else for feeding the preforms.

However, for this type of operation, a mold and the means it is equipped with, are relatively heavy and a wheel equipped with several molds has a very substantial moving mass.

Also envisioned in the area of blow molding (without stretching), is the machine described in U.S. Pat. No. 2,792,593 which comprises an apparatus for heating preforms and an assembly of molding stations fixedly arranged in an arc of a circle.

In this machine, the heating station is in the form of a sort of a tunnel in an arc of a circle, in which the preforms are displaced by means of a rotating carriage, whereas the molds are located on a concentric arc of a circle having the same radius as that described by the preforms.

In addition, with such a machine, the finished products issuing from the preforms cool in their molds before being conveyed to the other stations for evacuation.

Therefore, it is clear that with this machine it is impossible to obtain a continuous operation, and in addition, that the number of molding stations is very limited due to the space requirement of the heating apparatus.

The inventor has sought to design a continuously operational machine which benefits from the advantages of the rotating machines without having the disadvantages of large moving masses.

The machine according to the invention, of the aforementioned type, and therefore comprising at least one apparatus for heating the preforms and an assembly of molding stations fixedly arranged in an arc of a circle, is especially characterized in that the molding stations each comprise a finished product ejection means, whereas a rotary transfer device is provided between said heating apparatus and said molding stations for transfer of the heated preforms.

Thus, since the molding stations are fixed, it suffices for example, to rotationally drive only the control cams, of a negligible weight, contrary to the known technique where the molding stations are rotary and the control cams are fixed, whereas one can provide a large number of molding stations and a continuous operation, contrary to the aforementioned U.S. patent.

One embodiment according to the invention is characterized in that the transfer device between the heating apparatus and the molding stations has the shape of a wheel coaxial with the arc of a circle on which the molding stations are arranged, said wheel being provided with preform carrier means distributed uniformly on a circle to each take a heated preform and deposit the latter in a receiving means of a molding station.

For example, the preform carrier means are arranged at the ends of radially arranged arms. However, this arrangement is not mandatory and it could be a device of the star-shaped type, for example.

The transfer device then comprises a number of preform carrier means equal to a multiple of the number of molding stations.

Preferably, the transfer device is arranged to take each preform into the heating apparatus one-by-one, whereas it transfers said preforms into the molding station reception means all at once, at the moment when each molding station is located in front of a preform carrier means of the transfer device loaded with a preform, the molding and ejection operations occurring during the rotation and positioning of a new assembly of preform carrier means of the transfer device loaded with preforms.

In addition, and advantageously, the continuous and synchronous controls of the molding stations are carried out at least partially by cams driven in reverse rotation with respect to the rotational direction of the transfer device, such that the preforms are worked in decreasing order with respect to the length of the path covered between the heating apparatus and the corresponding molding station to ensure that the stabilization and thermal conditioning periods are substantially equal for each preform.

A special embodiment is characterized in that each molding station comprises several molds for several preforms, the rotary transfer device being provided to simultaneously execute, by rotation of said transfer device, the transfer of the preforms towards all the molding stations provided with reception means for this purpose, but for as many times as there are molds in the molding stations.

If the heating apparatus can have any shape, linear, U-shaped, or circular; in the case of an apparatus of the rotary unwinding type, in the shape of a wheel on which preforms to be heated and distributed are arranged, the inventor recommends that said wheel-shaped heating apparatus be positioned such that the preforms describe a circle substantially tangent to that described by the preform carrier means of the transfer device, and rotate in the opposite direction of the latter.

The invention will be better understood upon reading the following description and with reference to the annexed drawings wherein:

Figure 1:
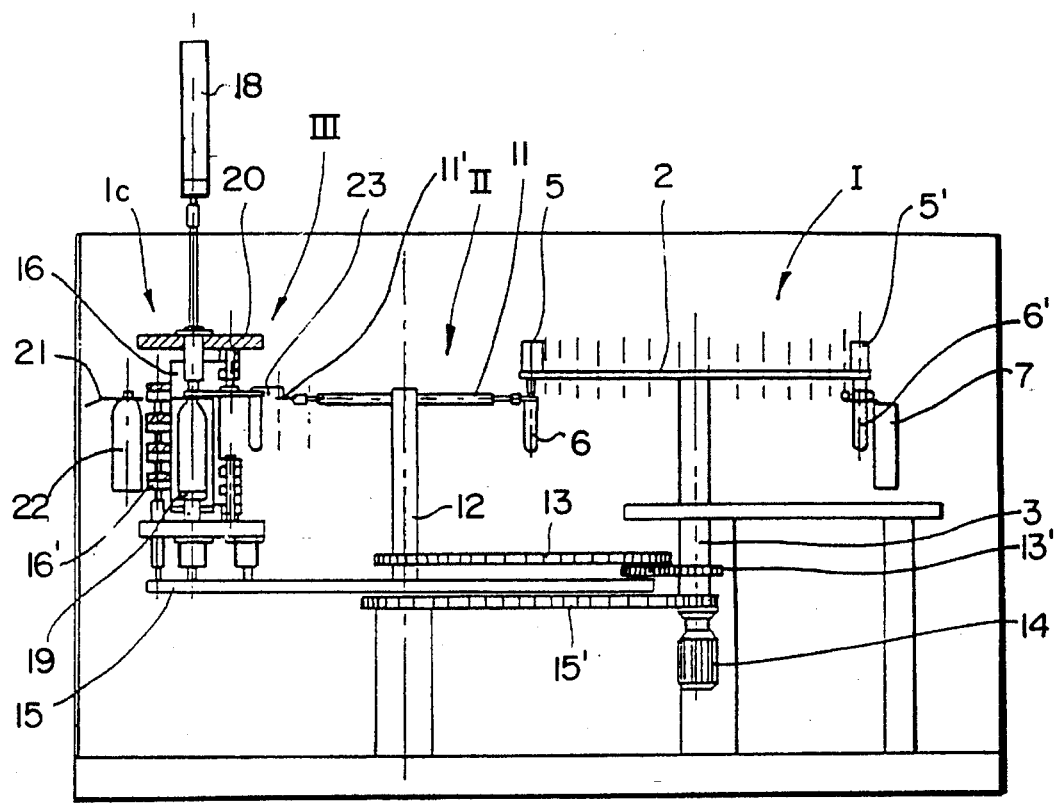
FIG. 1 is a section along A—A of FIG. 2.

The exemplary embodiment essentially comprises three combined devices: a heating apparatus I, preforms, a transfer device II and a preform transformation system, the latter comprising an assembly III of molding stations, here, six stations 1a–1f. In this example, each of the six molding stations is equipped with a single-cavity mold, but obviously, the number of stations and the number of molds can vary depending upon the requirements, devices I and II possibly being adapted in consequence.

As clearly shown in the drawings, stations 1a to 1f are fixed and arranged in an arc of a circle.

Heating device I essentially comprises a wheel 2 which rotates about an axis 3 in the trigonometrical direction by means of, for example, a motor 14.

Wheel 2 is provided with a plurality of mandrels such as 5 and 5' intended to carry preforms 6, 6' which are driven in the same rotational movement as mandrels 5, 5' but also in rotation on themselves.

Near the periphery of wheel 2, infrared ovens such as 7, intended to thermically condition the preforms, are arranged in an arc of a circle having a fixed station.

The preforms arrive on wheel 2 by means of a distributor 8 arranged to distribute the preforms on two guides 9 at the outlet of which a star-shaped feeder 10 is provided.

Thus, it is understood that the preforms such as 6, 6', originating from distributor 8, arrive on wheel 2 and run off by rotating in front of the ovens such as 7.

However, as already mentioned, it is clear that the heating apparatus could have another shape, and especially the shape of a U.

As clearly shown in the drawings, transfer device II is displayed in the shape of a plurality of arms such as 11, arranged along the radii of a wheel coaxial with the arc of a circle on which molding stations 1a–1f are arranged. The ends of arms 11 are equipped with preform carrier means 11'.

It is noted that here, as of now, the number of arms 11 double (namely 12) the number of molding stations, but it could be another multiple. Also, if the embodiment represented comprises arms, it could of course be a star-shaped or other device, means 11' being arranged on a circle.

Transfer device II is driven about an axis 12 in the opposite direction and in synchronism with wheel 2 of the heating apparatus, by means, for example, of a synchronous belt 13 and a gear system 13' (FIG. 1) actuated by axis 3 of wheel 2, said axis being rotationally driven, as already mentioned, by motor 14.

Control cams schematized by reference numeral 15 are rotationally driven opposite arms 11 of transfer device II and therefore, in the same direction as wheel 2 of apparatus I, for example, by belt 15' (FIG. 1).

Cams 15 are intended to control the various operations of molding stations 1a–1f.

Figure 2:
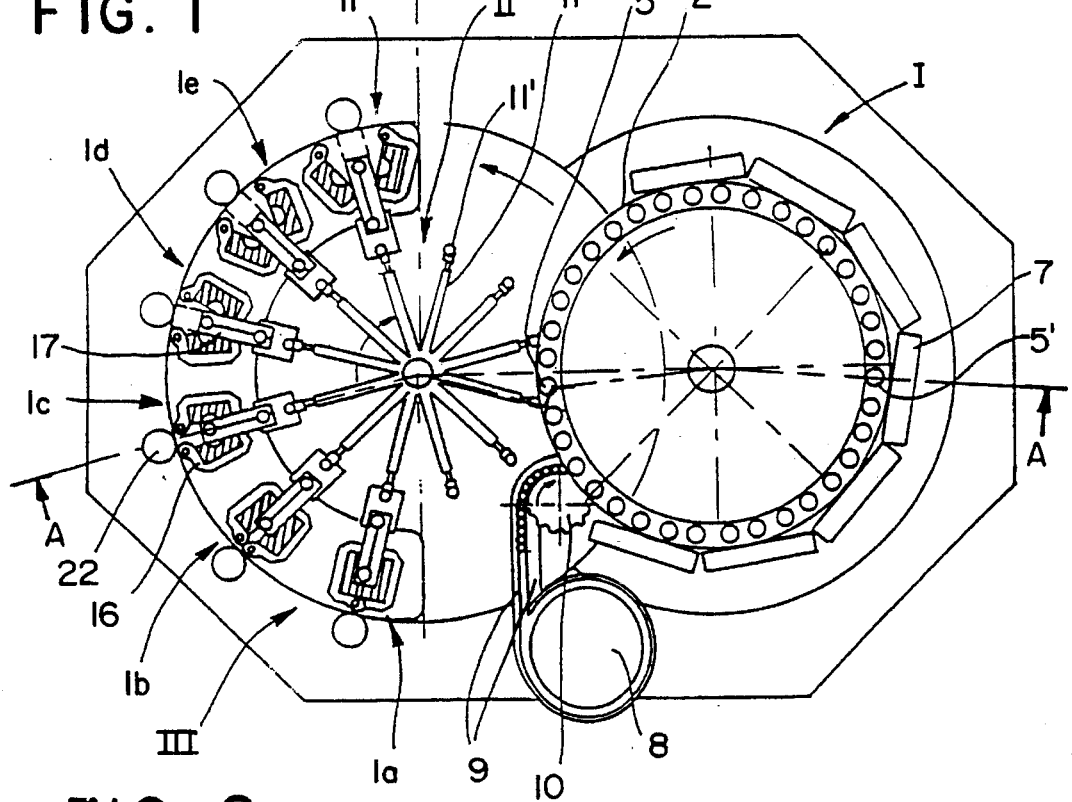
FIG. 2 is a planar view of a machine according to the invention.

Indeed, each post 1a–1f comprises:

a mold 16 and its mold carrier, equipped with latching means 16', a gripper 17 (FIG. 2) for simultaneous transfer of the bottles and preforms, a blow molding and pre-blow molding jack 18 (FIG. 1), a removable bottom 19, support plates 20, evacuation guides 21 for finished bottles 22, preform reception means 23.

Given that the molding stations are fixed, it is then understood that the air feeding by the jacks, the pre-blow molding and the blow molding, the water feeding for cooling, are advantageously simplified resulting in a simpler and less expensive production.

Thus, cams 15 enable continuous and synchronous initiation of the various functions of each molding station and especially:

the opening and closing of molds 16 and grippers 17, the driving of the to and fro movements of said grippers, the latching and unlatching of means 16' of molds 16, the vertical to and fro driving of removable bottom 19, the control of pre-blow molding jack 18 for stretching of the preforms and blow molding thereof.

The operational cycle is now easy to understand.

Preforms 6, 6' . . . , are transferred from distributor 8 towards wheel 2, via 9 and 10, and by virtue of mandrels 5, 5', . . . .

Then, the preforms are transferred from wheel 2 by transfer device II equipped with arms 11, towards mold assembly III.

To do this, means 11' of each arm 11, having grasped a preform, positions the latter in reception means 23 of the corresponding molding station.

Then, grippers 17 allow the preforms to be transferred into molds 16, while evacuating finished products 22 on evacuation guides 21; of course, a pneumatic conveyor or transporter can be provided downstream from said evacuation guides towards other storage and/or complementary treatment stations.

It is understood that arms 11 feed reception means 23 all at once, i.e., when each station 1a–1f is located opposite an arm loaded with a preform, whereas the molding operations occur successively from one station to another (see FIG. 2), by virtue of the reverse rotation of cams 15.

In this manner, the preform having covered the farthest distance between wheel 2 and its molding station will be treated first, thus ensuring substantially equivalent stabilization and thermal conditioning times for the preforms.

It is clear that as per the invention, substantial masses in rotational movement are eliminated, which avoids elaborate, heavy and costly mechanics, with, in addition, rotating water and air boxes.

The invention also enables the "idle time" to be reduced substantially for each cycle during which the mold remains in opening position, resulting in an improved efficiency.

Numerous variations can obviously be envisioned without departing from the scope of the invention. In particular, as already mentioned, each molding station can be provided for several preforms at once, requiring for example, a multiple loading by rotation of transfer device II which will have as many arms loaded with a preform in front of each molding station as there are molds for each of said stations, before the molding operations actually begin for each cycle.

I claim:

1. A machine for manufacturing hollow bodies from thermoplastic preforms by blow molding, comprising;

at least one preform heating apparatus;

an assembly of molding stations fixedly arranged in an arc of a circle, each of said molding stations comprises a finished product ejection means;

a rotary transfer device is provided between said heating apparatus and said assembly of molding stations to transfer the heated preforms; and cams which provide at least partial continuous and synchronous control of said molding stations, wherein said cams are driven in reverse rotation with respect to the direction of rotation of said transfer device, such that the preforms are worked in decreasing order with respect to the length of the path covered between said heating apparatus and said corresponding molding stations to ensure that the stabilization and thermal treatment periods are substantially equal for each preform.

2. A machine according to claim 1, wherein said transfer device has the shape of a wheel coaxial with an arc of a circle on which said molding stations are arranged, said wheel being provided with preform carrier means distributed uniformly along a circle to each take a heated preform and deposit the heated preform in a reception means of one of said molding stations.

3. A machine according to claim 2, wherein said preform carrier means are arranged at the ends of radially arranged arms.

4. A machine according to claim 2, wherein said transfer device comprises a number of preform carrier means equal to a multiple of the number of said molding stations.

5. A machine according to claim 2, wherein said transfer device is arranged to take each preform into said heating apparatus one-by-one, said transfer device transferring the preforms simultaneously into said reception means of said molding stations when each said molding station is located in front of said preform carrier means of said transfer device loaded with a preform, wherein the molding and ejection operations occur during rotation and positioning of a new assembly of said preform carrier means of said transfer device loaded with preforms.

6. A machine according to claim 1, wherein each said molding station comprises multiple molds for multiple preforms, wherein said transfer device rotates to transfer the preforms towards said molding stations, said molding stations being provided with reception means for as many molds as there are molding stations.

7. A machine according to claim 2, wherein said preform heating apparatus is in the shape of a wheel on which the preforms to be heated and distributed are arranged, wherein said wheel-shaped heating apparatus is positioned such that the preforms describe a circle substantially tangent to the circle defined by said preform carrier means of said transfer device, and wherein said wheel-shaped heating apparatus rotates in a direction opposite to the direction of rotation of said preform carrier means of said transfer device.

8. A machine for manufacturing hollow bodies from thermoplastic preforms by blow molding, comprising:

at least one preform heating apparatus;

an assembly of molding stations fixedly arranged in an arc of a circle, each of said molding stations comprises a finished product ejection means; and a rotary transfer device is provided between said heating apparatus and said assembly of molding stations to transfer the heated preforms;

wherein said transfer device has the shape of a wheel coaxial with an arc of a circle on which said molding stations are arranged, said wheel being provided with preform carrier means distributed uniformly along a circle to each take a heated preform and deposit the heated preform in a reception means of one of said molding stations; and wherein said transfer device is arranged to take each preform into said heating apparatus one-by-one, said transfer device transferring the preforms simultaneously into said reception means of said molding stations when each said molding station is located in front of said preform carrier means of said transfer device loaded with a preform, wherein the molding and ejection operations occur during rotation and positioning of a new assembly of said preform carrier means of said transfer device loaded with preforms.

9. A machine according to claim 8, wherein said preform carrier means are arranged at the ends of radially arranged arms.

10. A machine according to claim 8, wherein said transfer device comprises a number of preform carrier means equal to a multiple of the number of said molding stations.

11. A machine according to claim 8, further comprising:

cams which provide at least partial continuous and synchronous control of said molding stations, wherein said cams are driven in reverse rotation with respect to the direction of rotation of said transfer device, such that the preforms are worked in decreasing order with respect to the length of the path covered between said heating apparatus and said corresponding molding stations to ensure that the stabilization and thermal treatment periods are substantially equal for each preform.

12. A machine according to claim 8, wherein each said molding station comprises multiple molds for multiple preforms, wherein said transfer device rotates to transfer the preforms towards said molding stations, said molding stations being provided with reception means for as many molds as there are molding stations.

13. A machine according to claim 8, wherein said preform heating apparatus is in the shape of a wheel on which the preforms to be heated and distributed are arranged, wherein said wheel-shaped heating apparatus is positioned such that the preforms define a circle substantially tangent to the circle defined by said preform carrier means of said transfer device, and wherein said wheel-shaped heating apparatus rotates in a direction opposite to the direction of rotation of said preform carrier means of said transfer device.

14. A machine for manufacturing hollow bodies from thermoplastic preforms by blow molding, comprising:

at least one preform heating apparatus;

an assembly of molding stations fixedly arranged in an arc of a circle, wherein each of said molding stations includes a finished product ejection means including a gripper for transferring the preform to a mold; and a rotary transfer device provided between said heating apparatus and said assembly of molding stations to transfer the heated preforms.

15. A machine according to claim 14, wherein said ejection means further comprise evacuation guides for guiding the ejection of the preforms.

16. A machine for manufacturing hollow bodies from thermoplastic preforms by blow molding, comprising:

at least one preform heating apparatus;

an assembly of molding stations fixedly arranged in an arc of a circle, each of said molding stations comprises a finished product ejection means; and a rotary transfer device provided between said heating apparatus and said assembly of molding stations to transfer the heated preforms, wherein said rotary transfer device has the shape of a wheel coaxial with an arc of a circle on which said molding stations are arranged, said wheel being provided with preform carrier means distributed uniformly along a circle to each take a heated preform and deposit the heated preform in a reception means of one of said molding stations.

17. A machine according to claim 16, wherein said preform carrier means are arranged at the ends of radially arranged arms.

18. A machine according to claim 16, wherein said transfer device comprises a number of preform carrier means equal to a multiple of the number of said molding stations.

19. A machine according to claim 16, further comprising:

cams which provide at least partial continuous and synchronous control of said molding stations, wherein said cams are driven in reverse rotation with respect to the direction of rotation of said transfer device, such that the preforms are worked in decreasing order with respect to the length of the path covered between said heating apparatus and said corresponding molding stations to ensure that the stabilization and thermal treatment periods are substantially equal for each preform.

20. A machine according to claim 16, wherein each said molding station comprises multiple molds for multiple preforms, wherein said transfer device rotates to transfer the preforms towards said molding stations, said molding stations being provided with reception means for as many molds as there are molding stations.

21. A machine according to claim 16, wherein said preform heating apparatus is in the shape of a wheel on which the preforms to be heated and distributed are arranged, wherein said wheel-shaped heating apparatus is positioned such that the preforms describe a circle substantially tangent to the circle defined by said preform carrier means of said transfer device, and wherein said wheel-shaped heating apparatus rotates in a direction opposite to the direction of rotation of said preform carrier means of said transfer device.

* * * * *